(12) United States Patent
Sulzbach et al.

(10) Patent No.: US 6,358,036 B2
(45) Date of Patent: Mar. 19, 2002

(54) DEVICE FOR THE PRODUCTION OF FOAM SLABS OF ANGULAR CROSS-SECTION IN A FLOCK COMPOSITE

(75) Inventors: Hans-Michael Sulzbach; Bodo Büchel, both of Königswinter (DE)

(73) Assignee: Hennecke GmbH, Königswinter (DE)

( * ) Notice: Subject to any disclaimer, the term of this patent is extended or adjusted under 35 U.S.C. 154(b) by 0 days.

(21) Appl. No.: 09/873,024

(22) Filed: Jun. 1, 2001

Related U.S. Application Data

(62) Division of application No. 09/357,587, filed on Jul. 20, 1999, now Pat. No. 6,261,498.

(30) Foreign Application Priority Data

Jul. 29, 1998 (DE) .......................................... 198 34 100

(51) Int. Cl.[7] ................................................ B29C 43/04
(52) U.S. Cl. .................... 425/409; 425/817 R; 425/412
(58) Field of Search ................................ 425/4 R, 412, 425/324.1, 817 R, 409

(56) References Cited

U.S. PATENT DOCUMENTS

| 121,496 | A | * | 12/1871 | Derrick | ....................... 425/218 |
| 3,871,801 | A | | 3/1975 | Buchmann | ................... 425/4 R |
| 4,298,323 | A | * | 11/1981 | Haydt, Jr. | .................... 425/162 |
| 4,990,081 | A | * | 2/1991 | VanVoren et al. | ........... 425/330 |
| 6,224,797 | B1 | * | 5/2001 | Franzen et al. | ............. 264/45.3 |

* cited by examiner

Primary Examiner—Nam Nguyen
Assistant Examiner—Joseph S Del Sole
(74) Attorney, Agent, or Firm—Joseph C. Gil; Noland J. Cheung

(57) ABSTRACT

Angular blocks of foam flocks can be produced with angular edges and a homogeneous density distribution over the entire cross-section in a molding box by first extending the of adjacent mold walls before the flocks are introduced, and, after the flocks have been introduced, reducing it to the envisaged cross-section of the slab to be produced. Wherein, at every corner formed by two adjacent mold walls, one of the mold walls is divided into a wall part and a flap held thereon which can be moved around a swivelling axis perpendicular to the base and can be swivelled between a position pointing outwards and a position parallel with the wall part.

5 Claims, 1 Drawing Sheet

DEVICE FOR THE PRODUCTION OF FOAM SLABS OF ANGULAR CROSS-SECTION IN A FLOCK COMPOSITE

This is a divisional application of Ser. No. 09/357,587, filed Jul. 20, 1999, now U.S. Pat. No. 6,261,498.

FIELD OF THE INVENTION

The present invention relates to a process and a device for the production of foam slabs of angular cross-section in a flock composite, foam flocks being introduced into a molding box with adjoining mold walls and the filling then being compacted to the desired density or slab height by means of a stamp and the finished slab subsequently being removed from the mold.

BACKGROUND OF THE INVENTION

The production of composite slabs of angular cross-section from foam flocks, for example polyurethane foam is generally known. The flocks are sprayed with a binder or sintered or fused with one another. Depending-on the nature of the filling cross-section of the chosen molding box, the finished slabs, as a rule have a rectangular or square cross-section but they can also have angular or circular form.

While a density distribution which is homogeneous over the filling cross-section can be achieved in circular slabs, it is a disadvantage in the case of angular filling cross-sections that, in slab production, in particular as a function of the flock size and of the tendency of the flocks to form bridges, hollow spaces and rounded edges are formed during introduction of the flocks into the molding box, especially, in the corners thereof; a lower density, furthermore, forming in these corners rather than in the inside of the slab. In particular, the processing of flocks of the usual sizes of 12 to 15 mm present such difficulties.

Because of the hollow spaces and rounded-off corners and the inhomogeneous density—taken over the slab cross-section—attempts have already been made to subsequently stuff flocks into the corners manually. This means a higher expenditure of time during production, and the density achieved in the corners in such a manner depends solely on the skill of the operating staff and is not reproducible.

Therefore, for use of the slab material for objects with greater requirements, it is therefore often necessary to cut the finished angular flock composite slab to eliminate untrue edges and inhomogeneous corners. Needless to say, about 10% waste results from this practice, for which production work is lost, even though this waste as a rule can be recycled for lesser quality processes.

SUMMARY OF THE INVENTION

Therefore, an object of the present invention is to produce angular foam composite slabs with sharp edges and with a homogeneous density distribution over the entire slab cross-section by compacting the flock material.

This object is achieved in that before the foam flocks are introduced, the cross-section in every corner formed by two mold walls are extended to a filling cross-section, and after the foam flocks have been introduced, the filling cross-section is reduced to the desired shape of the cross-section of the slab to be produced, and only then, is the filling compacted to the desired density or slab height.

As a result of this measure, the total finished flock composite slab can be used, even for increased quality requirements, in particular, because of its homogeneous density distribution and fully filled corners. As a result, there is no waste. Subsequent manual stuffing is also not necessary. It goes without saying that the extension and reduction of the filling cross-section must take place over the entire height of the molding box or the filling height.

In practice, usually rectangular, in particular, square slabs are produced. However, the new invention can be applied to the production of all angular slabs. The more corners the slab has, the lower is the risk of inhomogeneity of density and unfilled corners during its conventional production. On the other hand, use of the new process is particularly advantageous for production of four-cornered or even only three-cornered slabs.

DETAILED DESCRIPTION OF THE INVENTION

Figure 1:
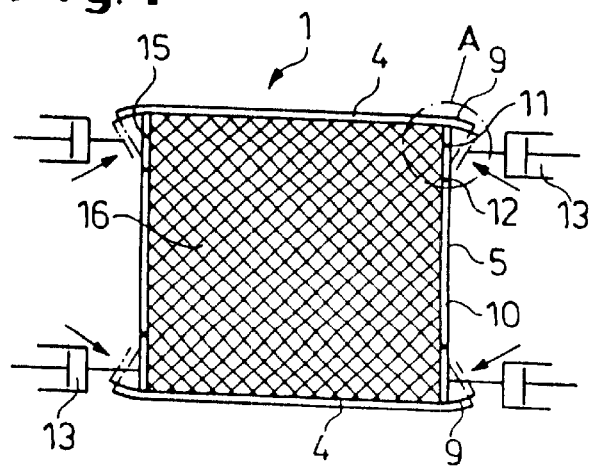
FIG. 1 shows the device with the loosely filled molding box in cross-section.

The new device for the production of foam slabs of angular cross-section by the flock composite process is based on a molding box with a base and several adjoining mold walls standing thereon, and a stamp which can be moved in the direction of the base.

In the present invention, at every corner formed by two adjoining mold walls, one of the mold walls is divided into a fixed wall part and a flap held thereon which can be moved around a perpendicular swivelling axis and can be swivelled between a position pointing outwards and a position parallel with the fixed wall part.

The result is that before filling, the filling cross-section is enlarged by swivelling the moveable flaps in the corners outwards, and that this position is maintained during filling with the flocks. When the filling operation has ended, the flaps are moved inwards, and as a result, the flocks from these extended regions are displaced inwards, so that hollow spaces possibly present beforehand disappear and the density in these regions, which is lower per se, is increased to the normal level. The required size of the extension of the filling cross-section and the associated angle of opening of the flaps and their width can best be determined empirically as a function of the properties of the flocks.

The particular mold wall adjacent to a flap preferably has, in the region of the swivel angle α of the flap, a curvature corresponding to this swivel angle α.

This embodiment is particularly advantageous because when the flocks are introduced into the molding box with the flaps swivelled outwards, a seal with respect to the adjoining mold wall then exists, so that no flocks can emerge. This seal is also maintained when the flaps are returned to their end position.

Preferably, the flaps can be activated with a hydraulic device. The pressure force needed to move the flaps can advantageously be applied in this way. Manual activation with locking etc. would of course also be possible, but is very expensive in time and staff.

In a manner which is customary per se and advantageous, the new device is equipped with a control apparatus so that the production operations substantially proceed automatically or semi-automatically. This control apparatus acts accordingly on the stamp and the hydraulic devices of the flaps and on the emptying operation.

The device is emptied in a manner know per se by raising the appropriately constructed molding box and pushing away the finished slab, or by folding down mold walls and removing the slab. In each case, the stamp must be moved back before emptying.

Preferably, the molding box has a rectangular or square cross-section in a manner known per se.

The new device is shown purely in diagrammatic form in the drawing and is described in more detail below.

Figure 3:
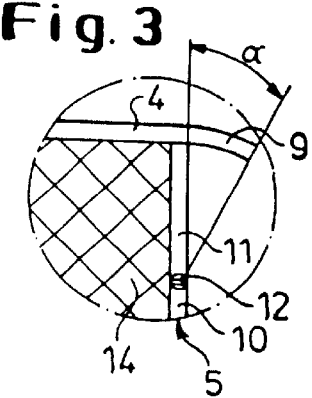
FIG. 3 shows detail A according to FIG. 1 in magnification.
Figure 2:
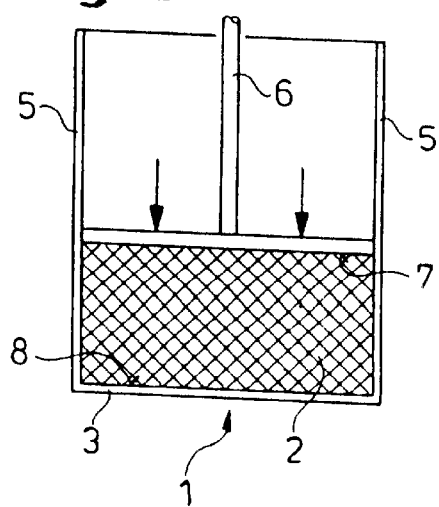
FIG. 2 shows the device in longitudinal section with a finished slab in the molding box.

In FIGS. 1 and 2, the device comprises a molding box 1 for the production of a composite slab 2 (FIG. 2) of square cross-section. The molding box 1 is demarcated by a base 3 and mold walls 4, 5. Above the molding box 1 is positioned a stamp 6, which can be moved into the molding box 1. This stamp 6 can be activated hydraulically and can be controlled by a control apparatus, which is not shown. The stamp's pressing surface 7 substantially corresponds in size and shape to the cross-section 8 of the slab 2 to be produced. The ends of the mold walls 4, opposite one another, have a curvature 9 (FIGS. 1, 3), while the mold walls 5 positioned perpendicular thereto and opposite one another each comprise a wall part 10 on which are held flaps 11 in a manner such that they can be moved around a swivelling axis 12 by means of hydraulic devices 13. In each case, corners 14 are formed between the walls 4 and the flaps 11. The filling cross-section is designated 15 and the filling 16.

In FIG. 2, the stamp 6 is in the end position of the compaction operation and the slab 2 is enclosed by this, the base 3 and the mold walls 4, 5, the wall part 10 and the flaps 11, in each case, being parallel to one another.

The mode of operation and the new process with the new device are as follows:

The mold walls 4, 5 of the molding box 1 rest on the base 3, forming a seal, with the flaps 11 of the mold walls 5 swivelled outwards through the angle α of 30°. The flaps 11 lie against the curvatures 9 to form a seal. With the stamp 6 raised, polyurethane foam flocks sprayed with binder and having an edge length of about 10 to 15 mm are now introduced into the filling cross-section 15 in a predetermined amount. The loose pile of such foam flocks has a density of about 15 kg/m$^3$. The filling 16 in the molding box 1 is to be compacted to a slab height of 0.5 m at a density of 60 kg/m$^3$. The flaps 11 are first swivelled inwards into the position parallel with the wall parts 10. During this operation, the flocks in the enlarged corners 14 are displaced inwards and as a result fill the hollow spaces formed. Since the enlargement in cross-section or volume for the filling operation was already known from empirical determinations, when the parallel position of the flaps 11 with the wall parts 10 is reached, there is a homogeneous density over the entire cross-section 8. The stamp 6 is now raised and the molding box 1 is then pulled upwards. The finished slab 2 can now be removed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A device for the production of foam slabs of angular cross-section by a flock composite process, comprising a molding box with a base and at least two adjacent mold walls fastened on said base, and a stamp which can be moved in the direction of said base, wherein at every corner formed by said two adjacent mold walls, one of said mold walls is divided into a wall part and a flap held thereon which can be moved around a swivelling axis perpendicular to the base and can be swivelled between a position pointing outwards and a position parallel with the wall part.

2. A device according to claim 1, wherein said mold wall adjacent to said flap has, in a region of a swivel angel α of the flap, a curvature which corresponds to the swivel angle α.

3. A device according to claim 1, wherein said flaps can be activated with a hydraulic device.

4. A device according to claim 1, wherein said molding box has a rectangular cross-section.

5. A device according to claim 4, wherein said molding box has a square cross-section.

* * * * *